United States Patent [19]

Hermeyer

[11] 4,066,232

[45] Jan. 3, 1978

[54] CLAMP-ON LEVEL HOLDER

[76] Inventor: Edward J. Hermeyer, P.O. Box 82, Gardnerville, Nev. 89410

[21] Appl. No.: 725,682

[22] Filed: Sept. 23, 1976

[51] Int. Cl.² ............................................. G01C 9/00
[52] U.S. Cl. ................................. 248/226.2; 248/314; 33/372
[58] Field of Search ................................. 33/370–373, 33/347; 248/226.2, 314

[56] References Cited

U.S. PATENT DOCUMENTS

| 1,358,651 | 11/1920 | Proppe | 248/314 |
| 1,520,407 | 12/1924 | Dolzer | 248/226.2 X |
| 1,747,710 | 2/1930 | Hanley | 248/226.2 X |
| 2,531,563 | 11/1950 | Feldheim | 33/371 X |
| 2,647,712 | 8/1953 | Sandmoen | 248/314 |
| 3,533,590 | 10/1970 | Swire | 248/226.2 X |
| 3,545,091 | 12/1970 | Sebastiani | 33/372 |

Primary Examiner—Charles E. Phillips
Attorney, Agent, or Firm—Herbert C. Schulze

[57] ABSTRACT

A device consisting of a rectangular shell affixed to a spring-type clamp for securement thereof onto a convenient location on a scaffolding or mortar board, the rectangular shell used for holding level in a convenient but safe location for use by construction workers, such as bricklayers, masons, and the like, when performing construction tasks, or for use in storing a level when not in use. The level is inserted through the open end of the rectangular shell, the level thus being maintained in a safe and out of the way location, with the spring-type clamp affixed to a desired surface, including a scaffolding, mortar board, home work bench, or the like.

4 Claims, 4 Drawing Figures

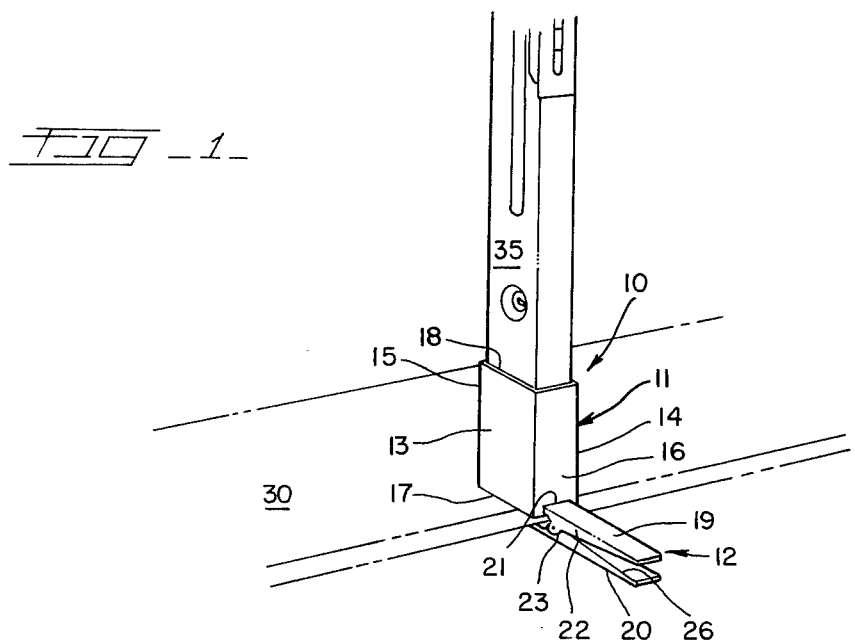
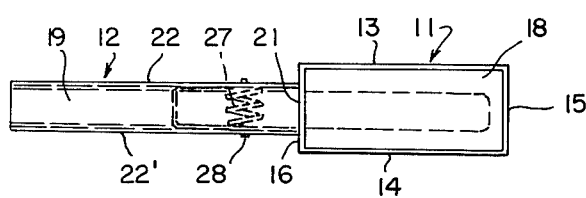
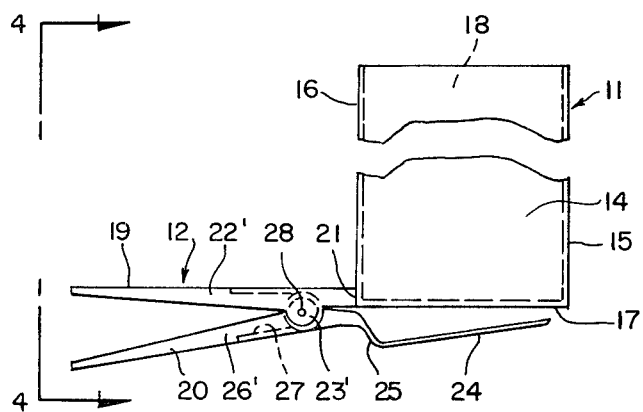
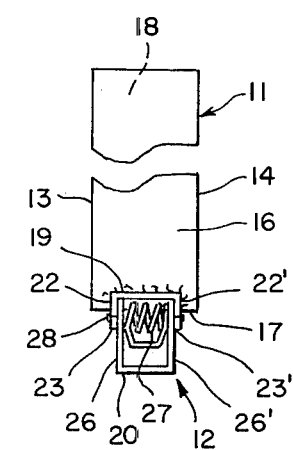
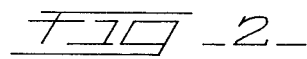

CLAMP-ON LEVEL HOLDER

BACKGROUND OF THE INVENTION

1. Field of the Invention

This invention relates to a clamp-on level holder for keeping a level in a safe and convenient location when in use or for storing a level in a safe, out of the way location when not in use.

2. Description of the Prior Art

It has always been a problem for construction workers, particularly bricklayers, masons, and other skilled building tradesmen not to misplace or damage levels when working on construction jobs or to store levels in a convenient location. Presently, a level is normally laid aside on a scaffolding or the like from which a level tends to be easily knocked off or jarred loose and to fall therefrom, thereby causing breakage or damage. Various assistance devices have been devised for assisting tradesmen in the use of levels, such as U.S. Pat. No. 3,545,091 issued to Sebastiani relating to a universal spirit level, U.S. Pat. No. 3,389,471 issued to Blake describing a guide device for attachment to the wall of a building under construction, U.S. Pat. No. 2,931,104 issued to Taylor et al. illustrating a masons' corner pole and accessories therefor and U.S. Pat. No. 2,893,125 issued to Kampel pertaining to a line holding device for bricklaying, but no device is available for holding an ordinary level in a safe or convenient location. There is, then, an obvious need in the market-place for a simple and inexpensive device for holding a level in a safe and convenient location when being used and for storing a level in a safe and out of the way location when not in use.

SUMMARY OF THE INVENTION

The present invention provides a clamp-on level holder for holding a level in a safe and convenient location during use or for holding a level in a safe and out of the way location when not in use.

It is a feature of the present invention to provide a clamp-on level holder.

A further feature of the present invention provides a clamp-on level holder which is portable and easy to use and reliable and efficient in operation.

Yet still a further feature of the present invention provides a clamp-on level holder which is of a rugged and durable construction and which, therefore, may be guaranteed by the manufacturer to withstand rough and continual usage.

An additional feature of the present invention provides a clamp-on level holder which is simple in construction and which, therefore, may be produced by a manufacturer at an economical cost so as to encourage widespread usage thereof.

Other features of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the clamp-on level holder with a level contained therein and affixed to a scaffolding or the like; and FIG. 2 is a side elevational view of the clamp-on level holder; and FIG. 3 is a top view of the clamp-on level holder; and FIG. 4 is an end elevational view of the clamp-on level holder.

DESCRIPTION OF THE PREFERRED EMBODIMENT

Referring now to the drawings in detail, there is illustrated a preferred form of the clamp-on level holder constructed in accordance with the principles of the present invention and which is designated generally in its entirety by the reference numeral 10 and which is comprised of a rectangular shell 11, a spring clamp 12, and associated hardware and interconnecting components as will be later described.

The rectangular shell 11 is constructed of durable material, such as sheet metal, plastic, or the like and consists of opposed side walls 13 and 14, opposed end walls 15 and 16, and a bottom wall 17 integrally conjoined with the bottom edges of the side walls 13 and 14 and the end walls 15 and 16 so as to form the interior compartment 18 therebetween.

The spring clamp 12 is constructed of rigid and durable material, such as steel or rigid plastic, and, as shown in the drawings, consists of a top member 19 and a bottom member 20, the top member 19 being securely affixed at its front edge 21, such as by welding, being integrally molded in the case of plastic, or the like, to the end wall 16 located centrally thereon adjacent the bottom wall 17, with the top member 19 being further provided with opposed tapered flanges 22 and 22' perpendicularly conjoining the long edges of the top member 19 and extending downwardly from the bottom wall 17 and with the flanges 22 and 22' having a semi-circular lip 23 and 23' respectively located a short distance from the end wall 16 and provided with round through holes (not shown) located centrally within the lips 23 and 23' so as to be in axial alignment with each other. The bottom member 20 is constructed of the same material as the top member 19 and is generally of the same configuration as the top member 19 but is longer in overall length with the extension 24 being angularly disposed as shown by the reference numeral 25 below the bottom wall 17 so as to extend near the end wall 15, the bottom member having opposed tapered flanges 26 and 26' perpendicularly conjoining the long edges of the bottom member 20 so as to extend upwardly toward the bottom wall 17 and extending in length along the bottom member 20 rearwardly of the end wall 16, the flanges 26 and 26' further being provided with a semicircular lip (not shown) and with round through holes (also not shown) so as to axially line up internally between the flanges 22 and 22'. A coil spring 27 is affixed between the lips 23 and 23' on the flanges 22 and 22' and between the lips (not shown) on the flanges 26 and 26' and is affixed therein by means of a pin 28 extending between the round through holes noted above, the spring 27 biasing the top member 19 outwardly from the bottom member 20, with the ends of the spring 27, as shown in FIGS. 2 and 3, being positioned against the inside surfaces of the top member 19 and the bottom member 20 and internally of the flanges 22 and 26.

In operation, the user would grasp the top member 19 and the bottom member 20 within the palm of one's hand, compress the bottom member 20 against the top member 19 so as to enlarge the space or opening between the extension 24 and the bottom wall 17, position the bottom wall 17 onto a scaffolding 30, a mortar board, workbench, or the like, and release the bottom member 20 so that the extension 24 is forced upwardly against the bottom surface of the scaffolding 30 by means of the coil spring 27 so as to provide a snug fit thereon. A level 35 is then positioned within the interior compartment 18 so as to seat against the bottom wall 17 and is held securely therein in a safe and convenient location when the user is working or in a safe and out of the way location when the level 35 is not being used. The level 35 can be removed from the interior compartment 18 and the clamp on level holder 10 can be removed from the scaffolding 30 for relocation to another area by reversing the above described procedures.

There is thus described a novel clamp on level holder which meets all of its stated objectives and which overcomes the disadvantages of placing a level in a location where it can be misplaced or damaged.

It is to be understood that the form of this invention as shown and described is to be taken as a preferred example thereof, and that this invention is not to be limited to the exact arrangement of parts described in the description or illustrated in the drawings as changes thereto in the details thereof pertaining to size, shape and arrangement of parts thereof are envisioned within the scope of the invention without departing from the novel concepts of the invention.

Having thus described the invention, what is claimed is:

1. A clamp on level holder for maintaining a level in a safe and out of the way location when not in use or in a safe and convenient location when in use, the device comprising, in combination:
    a rectangular shell consisting of opposed side walls, opposed end walls, and a bottom wall integrally conjoined with the bottom edges of said side walls and said end walls to form an interior compartment therebetween; and
    a spring clamp consisting of a top member and a bottom member, said top member being securely affixed to a said end wall so as to be centrally located thereon adjacent to said bottom wall, said top member further being provided with opposed tapered flanges perpendicularly conjoining the long edges of said top member and extending downwardly therefrom and from said bottom wall, with said flanges having a semi-circular lip disposed a short distance from said end wall of said shell and provided with round through holes centrally located within said lips so as to be in axial alignment with each other, said bottom member being generally of the same configuration as said top member but longer in overall length with an extension being angularly disposed between said bottom wall of said shell, said bottom member having opposed tapered flanges perpendicularly conjoining the long edges of said bottom member so as to extend upwardly therefrom and toward said bottom wall of said shell and extending in length along said bottom member rearwardly of said end wall, said flanges being further provided with a semi-circular lip and with round through holes so as to axially line up internally between said flanges and said lips on said top member; and
    a coil spring affixed between said lips on said flanges and between said top member and said bottom member, with said spring affixed therein by means of a pin extending between said round holes in said lips, the ends of said spring being positioned against the inside surfaces of said top member and said bottom member and internally of said flanges so as to bias said top member upwardly from said bottom member wherein said bottom wall of said shell and said extension cooperate to form a clamp.

2. A clamp on level holder as set forth in claim 1 wherein a level is positioned within said interior compartment of said rectangular shell so that, with said spring clamp attached to a scaffolding or the like, said level is maintained in a fixed location.

3. A clamp on level holder as set forth in claim 1 wherein said rectangular shell and said spring clamp are constructed of steel.

4. A clamp on level holder as set forth in claim 1 wherein said rectangular shell and said spring clamp are constructed of rigid plastic.

* * * * *